(12) United States Patent
Okamoto et al.

(10) Patent No.: US 6,552,502 B2
(45) Date of Patent: Apr. 22, 2003

(54) LIGHT SOURCE DEVICE

(75) Inventors: Masashi Okamoto, Akashi (JP); Mineo Nakayama, Himeji (JP); Izumi Takaya, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/095,434

(22) Filed: Mar. 13, 2002

(65) Prior Publication Data

US 2002/0130626 A1 Sep. 19, 2002

(30) Foreign Application Priority Data

Mar. 13, 2001 (JP) ........................................ 2001-070474

(51) Int. Cl.[7] .............................. H01J 11/04; H01J 17/44
(52) U.S. Cl. ...................... 315/336; 315/335; 315/330; 315/246; 315/56; 313/594; 313/620
(58) Field of Search ................................. 315/336, 335, 315/330, 331, 246, 261, 262, 56, 60; 313/607, 594, 620, 639, 601

(56) References Cited

U.S. PATENT DOCUMENTS

| | | | | |
|---|---|---|---|---|
| 4,447,759 A | * | 5/1984 | Moerkens et al. | ............ 315/60 |
| 4,910,437 A | * | 3/1990 | Daniels | ....................... 315/208 |
| 5,233,273 A | * | 8/1993 | Waki et al. | .................. 315/224 |
| 5,627,430 A | * | 5/1997 | Kira et al. | ................... 313/570 |
| 5,986,402 A | * | 11/1999 | Narita et al. | ................ 313/620 |

FOREIGN PATENT DOCUMENTS

| | | |
|---|---|---|
| JP | 37-8045 | 4/1937 |
| JP | 05-054983 | 3/1993 |

* cited by examiner

*Primary Examiner*—Don Wong
*Assistant Examiner*—Tuyet T. Vo
(74) *Attorney, Agent, or Firm*—Nixon Peabody LLP; David S. Safran

(57) ABSTRACT

Light source device which includes a discharge lamp which contains at least 0.15 mg mercury per cubic millimeter of the volume of the discharge space, a pair of electrodes opposite one another to create the main discharge and spaced a distance from one another of less than or equal to 2.5 mm, and an auxiliary electrode arranged such that it does not come into contact with the discharge space for the main discharge. The light source device further including a feed circuit to feed the discharge current to the electrodes for the main discharge, and a starter which produces a high voltage between one of the electrodes of the two electrodes for the main discharge and the auxiliary discharge, such that the starter produces a voltage two to five times as high as the voltage necessary for starting the main discharge in the lamp at the room temperature state.

6 Claims, 11 Drawing Sheets

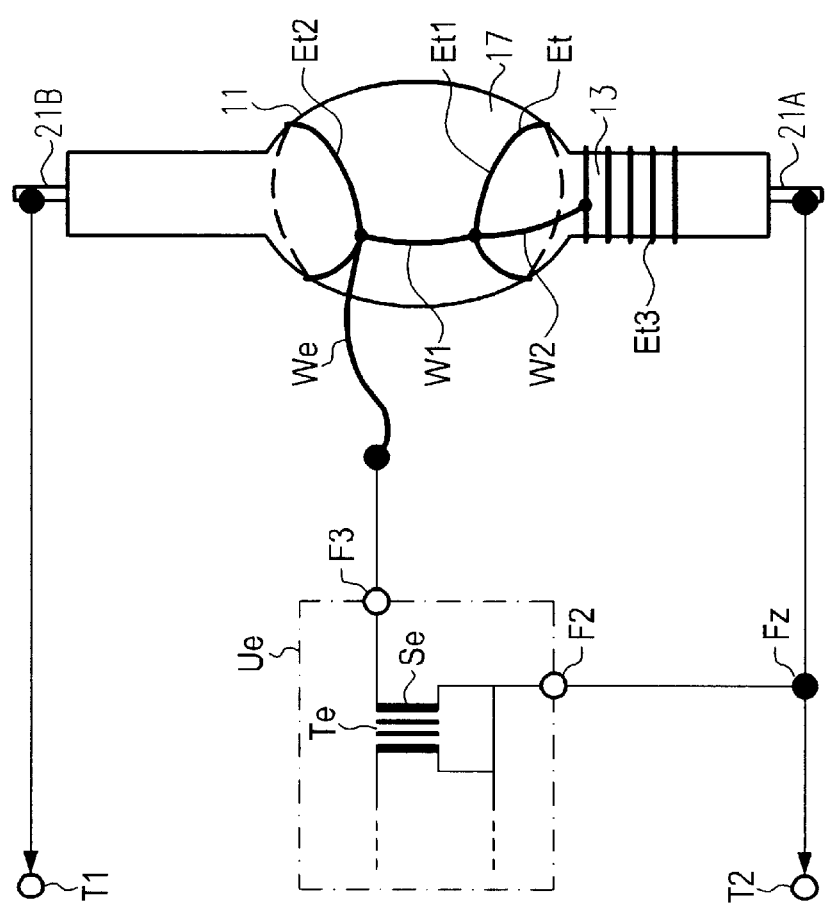
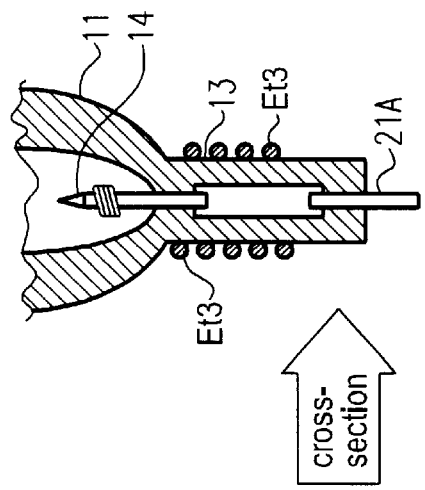
Fig.9(a)
Fig.9(b)

LIGHT SOURCE DEVICE

BACKGROUND OF THE INVENTION

1. Field of the Invention

The invention relates to a light source device using a high pressure mercury discharge lamp which can be used as a light source for a projector.

2. Description of Related Art

In a light source device for an optical device, such as a liquid crystal projector, a DLP™ projector (Texas Instruments) or the like, a discharge lamp with high radiance (HID lamp) is used. Recently there has been a need for a greater amount of mercury to be added to the discharge lamp than was conventional in the past in order to make the optical device more radiant. In one such discharge lamp, it is necessary to use a starter which operates at a high voltage when starting and subjects the discharge space light source to insulation breakdown which results in a discharge.

FIG. 12 illustrates the arrangement of such a conventional discharge lamp light source device. In a light source device for an optical device, conventionally a starter (Ui) is used by which a high voltage is applied between the electrodes (E1, E2) of the two poles. In this system, the secondary winding (Si) of the high voltage transformer (Ti) of the starter is series connected to a lamp (Li). After a discharge begins, operation of the starter (Ui) is no longer necessary. The discharge current supplied to the lamp (Li) must nevertheless flow via the secondary winding (Si) of the high voltage transformer having a large number of windings. To suppress the formation of heat loss in the winding (Si), it is necessary to make the winding wire diameter large, resulting in the disadvantage that an increase in the size and weight of the starter (Ui) is inevitable.

As a means for eliminating this disadvantage, an outside trigger method, which is often used for the triggering of a blinking lamp, can be used. In this method, in addition to the first electrode and the second electrode of the two poles for the main discharge, i.e. the arc discharge after starting, there is provided an auxiliary electrode between which a high voltage is applied to the first or the second electrode. Plasma is produced by a dielectric barrier discharge in the discharge space between the first electrode and the second electrode by means of a voltage applied beforehand (no-load voltage) then a main discharge is started, such that these plasmas act as the triggering substance.

After starting the lamp discharge, no lamp discharge current flows in the primary winding and the secondary winding of the high voltage transformer of the starter in this arrangement. Consequently, there is no heat loss in the primary and secondary windings of the high voltage transformer of the starter. Therefore, both an increase in the size and weight of the starter can be prevented.

In a discharge lamp containing a large amount of mercury, however, the pressure in the discharge space is low due to condensation of the mercury when the lamp is at room temperature. In this situation, starting can take place rather easily. However, in the situation of a hot lamp, that is immediately after being turned off, the pressure in the discharge space is high because the mercury has been vaporized. The disadvantage here is that restart (hot restart) is difficult.

The disadvantage associated with a difficult restart under hot restart conditions is serious for an optical device, such as a projector or the like, with respect to the adverse effect on the ease of re-use by a user of the device. The disadvantage of a difficult restart has become more and more serious in recent years for the outside trigger method due to increase in the amount of mercury contained in the device.

On the other hand, conventionally the discharge lamp (Li) and a feed device (Ni) were connected to one another by supply lines (K1, K2) with the starter (Ui) for starting the discharge lamp (Li) being located on the feed device (Ni) side in order that the starter (Ui) can generate a high voltage. In the case in which the starter (Ui) generates a pulsed high voltage, the feed lines (K1, K2) are quickly placed under a high voltage, resulting in the disadvantage that strong noise was emitted.

Furthermore, dulling distortion of the pulsed high voltage is caused by the electrostatic capacity which is formed between the feed lines (K1, K2) and the conductor, and by the inductance of the feed lines (K1, K2). As a result, the voltage increase between the lamp electrodes (E1, E2) is reduced. In order to obtain the pulsed voltage necessary for starting the discharge lamp, a greater energy than necessary must be emitted by the starter (Ui) onto the feed lines (K1, K2). In addition, the pulse width is broadened by dulling distortion of the pulsed high voltage. This increases the possibility of an insulation breakdown in an unintended area, such as the insulation coating of the high voltage transformer (Ti) of the starter and of the feed lines (K1, K2) or the like. This resulted in the danger that reliability would be reduced.

On the other hand, in a starter called a DC starter which produces a high voltage, i.e., in which the voltage increases relatively slowly, the insulation breakdown phenomenon is more frequent the higher the voltage and the longer the voltage application time. Here the disadvantage of the possibility of forming of an insulation breakdown in an unintended area is even more increased.

A conventional solution for starting a high pressure discharge lamp using the outside trigger method is shown in the Japanese utility model SHO 37-8045. In this method an arrangement is described in which there is a coil in which at the lamp current of a high pressure mercury lamp a magnetic force is produced and in which operation of a starter circuit at a high pressure produced by the magnetic force of an auxiliary electrode is controlled.

Furthermore, in the approach described in the Japanese patent disclosure document HEI 5-54983 an arrangement is described in which in a lamp such as a high pressure mercury lamp there are auxiliary electrodes (outside electrodes) with a distance of a few millimeters between each other.

However, in each of these conventional approaches for a light source device in which, even for the above described hot restart, the disadvantage of formation of an insulation breakdown in an unintended area and the problem of restarting cannot overcome.

SUMMARY OF THE INVENTION

The primary object of the present invention is to eliminate the above discussed disadvantages in the prior art, which are:

- that an increase in the size and weight of the starter cannot be avoided in order to prevent heat loss in the windings;
- that a restart is difficult when the period after being turned off is short and the lamp is still hot;
- that noise is emitted;
- that as a result of capacitive coupling between the feed lines and the conductor in the vicinity of the starter a greater amount of energy than necessary must be applied to the feed lines, and that the possibility of the formation of a insulation breakdown in an unintended area increases; which causes a reduction in reliability.

These disadvantages are overcome by a light source device which comprises the following:

a discharge lamp (Ld) which contains greater than or equal to 0.15 mg mercury per cubic millimeter of the volume of a discharge lamp (12), in which there is a pair of electrodes (E1, E2) positioned opposite one another to create the main discharge with a distance between each other of less than or equal to 2.5 mm, and in which in addition to the above described electrodes for the main discharge there is provided an auxiliary discharge electrode (Et) positioned such that it does not come into contact with the discharge space (12) for the main discharge;

a feed circuit (Bx) for supplying the discharge current to the above described electrodes (E1, E2) for the main discharge; and a starter (Ue) which produces a high voltage between one of the two electrodes (E1, E2) for providing the main discharge and the above the auxiliary discharge electrode (Et), so that the light source device has a starter (Ue) which produces a voltage twice to five times as high as a voltage which is necessary for starting the above described main discharge in the lamp when at a room temperature state.

Further, the object of the invention is achieved by a high voltage generating part (Ub) which contains at least one high voltage transformer (Te) in a starter circuit separated from the feed circuit part (By).

Additionally, the object of the invention is achieved by a lamp (Ld) and at least the high voltage transformer (Te) being made as a one-part unit.

In the outside trigger method, the starting property cannot be improved by simply increasing only one of the applied voltages, i.e., the high voltage applied between the first electrode (E1) or the second electrode (E2) and the auxiliary electrode (Et) and the no-load voltage in order to start the main discharge.

It is necessary to apply the above described high voltage and no-load voltage in a suitable ratio according to the length of the time period after turn-off, i.e., according to the lamp conditions, for example, lamp temperature at the time of starting. Furthermore, it has become apparent that, depending on the time period after turn-off, one or both of the high voltage or no-load voltage applied becomes very high, even when a suitable ratio is maintained, and that there is again the above described danger of formation of an insulation breakdown in an unintended area when restart is attempted.

Therefore, the lower boundary of the dielectric strength which can be imparted to a light source device is determined with respect to the compactness and economic efficiency required by the optical device, which results in a minimum time after turn-off before which a restart is possible.

BRIEF DESCRIPTION OF THE DRAWINGS

FIG. 8(*b*) is a schematic representation of another embodiment of the arrangement of the auxiliary electrode of a lamp of a discharge lamp light source device of the invention;

FIG. 9(*a*) is a schematic representation of an embodiment of a lamp with a conductor which surrounds the cathode side of the hermetically sealed portion of the discharge lamp light source device of the invention;

FIG. 9(*b*) is a partial cross section of the embodiment of a lamp with a conductor which surrounds the cathode side of the hermetically sealed portion shown in FIG. 9(*a*);

FIG. 10(*b*) is a cross-sectional view of the lamp shown in FIG. 10(*a*);

DETAILED DESCRIPTION OF THE INVENTION

Figure 1:
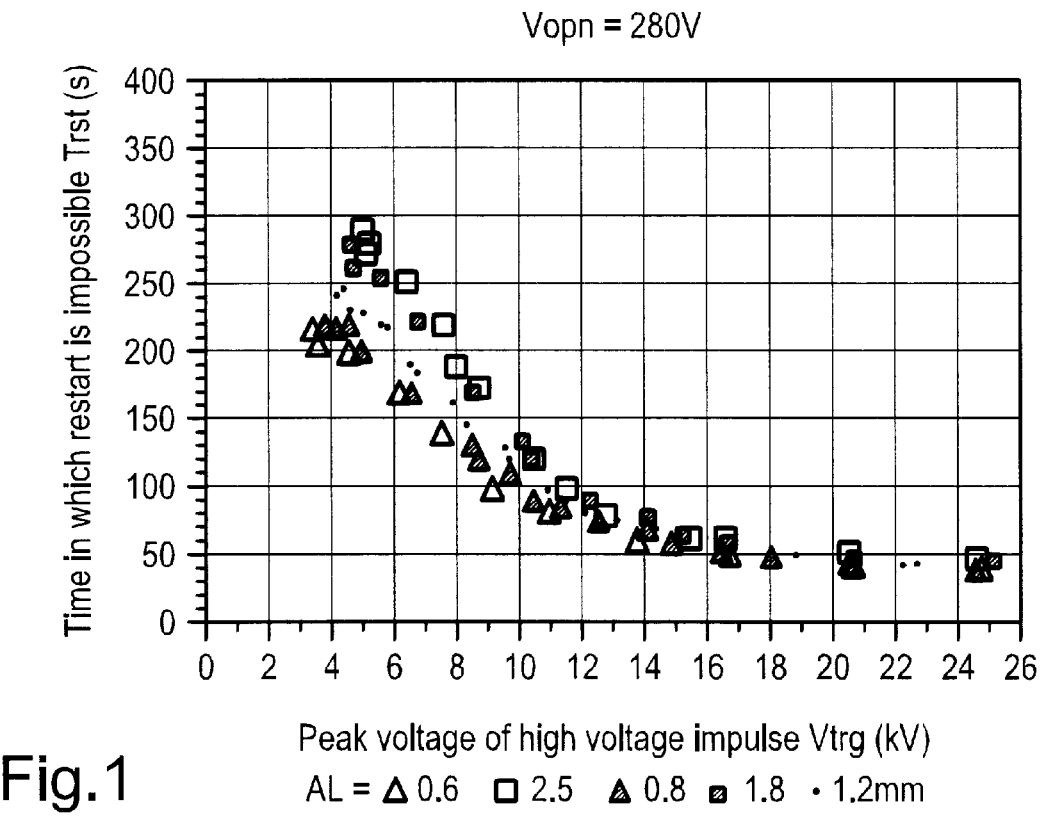
FIG. 1 is a graph showing the results of a test in which the starter voltage and the time in which a restart is impossible were measured in lamps with different intervals between the electrodes.
Figure 2:
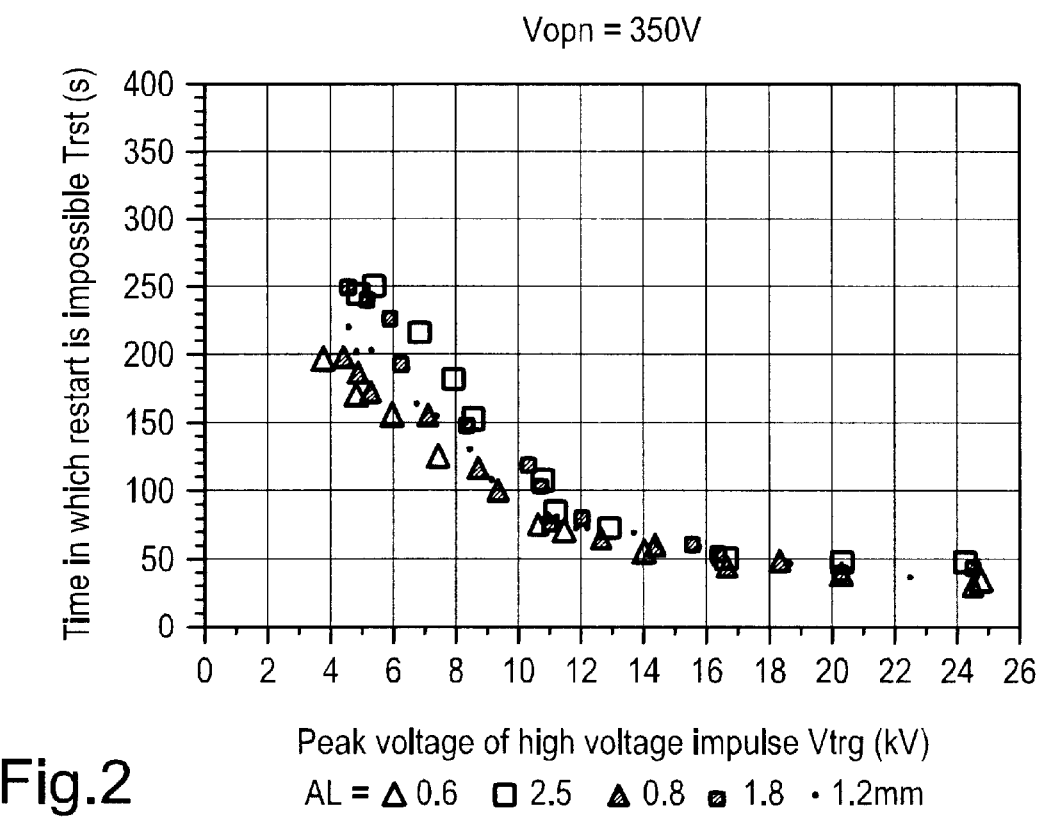
FIG. 2 is a graph showing the results of a test in which the same measurements as in FIG. 1 was taken at a different no-load voltage.
Figure 3:
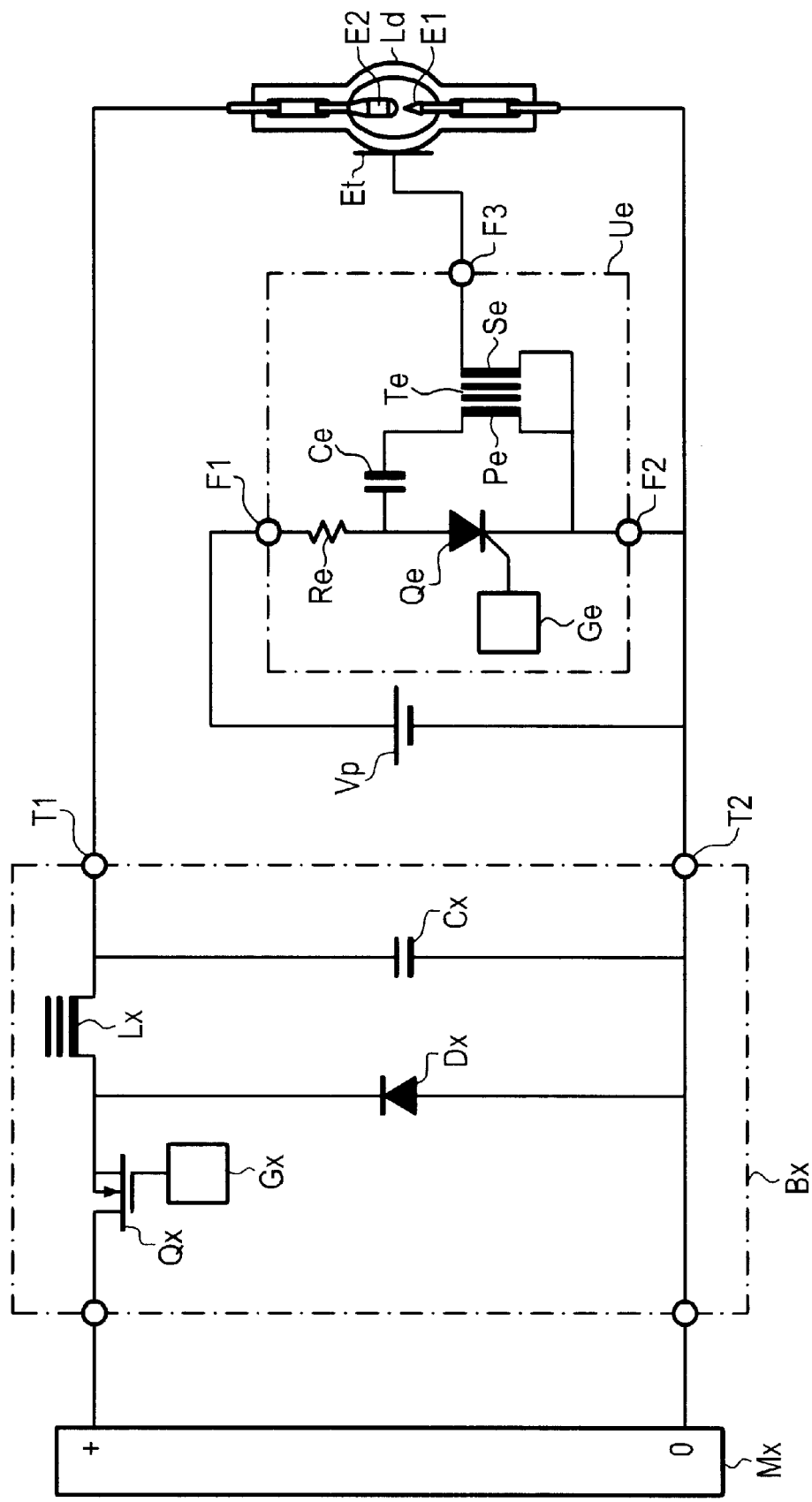
FIG. 3 is a circuit diagram of the arrangement of a test circuit for the measurements shown in FIGS. 1 and 2.

The invention is first described by referring to FIGS. 1–3. FIGS. 1 & 2 show the results of the tests using a lamp which contains argon, 0.2 nanomole bromine per cubic millimeter of volume of the discharge space and 0.15 mg mercury per cubic millimeter of volume of the discharge space, and in which the distance (AL) between the electrodes of the two poles for the above described main discharge, i.e., the first electrode and the second electrode, is 0.6 mm to 2.5 mm.

FIG. 1 illustrates when a no-load voltage (Vopn) of 280 V is applied, and FIG. 2 illustrates when a no-load voltage (Vopn) of 350 V is applied. Tests were performed, as shown in FIG. 3, such that a DC source (Mx), a feed circuit (Bx) and a starter (Ue) were connected to the lamp (Ld). A variable voltage source (Vp) was connected to the primary winding (Pe) of the high voltage transformer of the starter in order to supply it with an independent voltage. In the state in which the no-load voltage (Vopn) was applied to the lamp (Et), between the first electrode (E1) and the auxiliary electrode (Et) a high voltage pulse was applied which was produced by the above described starter (Ue). This is how the tests results shown in FIGS. 1 & 2 were achieved.

When the above described high voltage pulse was applied, the lamp (Ld) had been operated for four minutes beforehand, after it was turned off the voltage of the above described variable voltage source (Vp) was gradually increased from a low value and the time up to successful starting of the lamp (Ld), i.e., the time (Trst) at which restart is unnecessary, was measured (y-axis in FIGS. 1 & 2).

After the lamp (Ld) was turned off, the connection of the secondary winding (Se) of the high voltage transformer of the starter to the auxiliary electrode (Et) of the lamp was interrupted once, the secondary side of the high voltage transformer of the above described starter was shifted into a no-load state, the above described starter (Ue) was operated, the voltage of the above described variable voltage source (Vp) remaining the same as with successful starting of the lamp (Ld), the voltage formed in the secondary winding (Se) of the high voltage transformer of the starter was measured using an oscilloscope and this measured value was fixed as the peak voltage (Vtrg) of the high voltage pulse (x-axis in FIGS. 1 & 2). The condition that in the area with a lower peak voltage (Vtrg) of the high voltage pulse the degree of successful starting of the lamp (Ld) is less than 50% is not plotted in either FIG. 1 or FIG. 2.

Under the respective condition of no-load voltage and distance between the electrodes in FIGS. 1 and 2 there were cases in which even under the condition of a lower peak voltage (Vtrg) of the high voltage pulse successful starting was randomly carried out. Since it can be imagined that these examples are variations of the phenomenon, under the condition of a degree of success of less than roughly 50% with repeated attempts no plot was made.

In FIGS. 1 & 2, the peak voltage (Vtrg) of the high voltage pulse and the time (Trst) in which a restart is impossible yield the voltage Vtmin necessary for starting the above described main discharge in the lamp of the invention when at room temperature state, and a maximum value Trmax of the time in which a restart is impossible, the peak voltage (Vtrg) of the high voltage pulse and the time (Trst) in which a restart is impossible corresponding to the left end of the plotted point group with regard to the respective distance (AL) between the electrodes for the main discharge.

Using FIGS. 1 & 2, reference can be immediately made to the following:

at a respective distance (AL) between the electrodes for the main discharge the time (Trst) in which a restart is impossible is shortened more, the more the peak voltage (Vtrg) of the high voltage pulse is increased;

the effect that the time (Trst) in which a restart is impossible is shortened more, the more the peak voltage (Vtrg) of the high voltage pulse is increased is great until a voltage twice as high as the voltage Vtmin necessary for starting the above described main discharge in the lamp in the room temperature state is achieved; and a further shortening of the time (Trst) in which a restart is impossible can hardly be expected even if the peak voltage (Vtrg) of the high voltage pulse is increased beyond a voltage five times as high as the voltage Vtmin which is necessary for starting the above described main discharge in the lamp in the room temperature state.

This embodiment is explained in detail below.

If for example the data about the distance between the electrodes of 1.2 mm in FIG. 1 are observed, the voltage Vtmin which is necessary for starting the above described main discharge in the lamp in the room temperature state is 4.1 kV. In the area which proceeding from Vtmin reaches the part which corresponds to a voltage twice as high as Vtmin, i.e. a voltage of 8.4 kV, the time (Trst) in which a restart is impossible decreases according to the increase in the peak voltage (Vtrg) of the high voltage pulse without stoppage. In the area which extends beyond a voltage five times as high as the voltage Vtmin, however, the plotting points are essentially horizontal to one another even when the peak voltage (Vtrg) of the high voltage pulse increases. Here, the time (Trst) in which a restart is impossible does not decrease. This circumstance can be mentioned with respect to the data about the other distances between the electrodes and is the same regardless of the values of the no-load voltage (Vopn).

With respect to the peak voltage (Vtrg) of the high voltage pulse, at a voltage which is less than twice the voltage Vtmin which is necessary for starting the above described main discharge in the lamp in the room temperature state, the possibility of an improvement of the restart property is not effectively used in the case in which the conditions for the above described hot restart are desired. If conversely, the peak voltage (Vtrg) of the high voltage pulse is increased more than five times as high as the voltage Vtmin which is necessary for starting the above described main discharge in the lamp in the room temperature state, any possibility of improving the restart property under the conditions for the above described restart can be hardly expected, but it becomes apparent that rather the above described danger of an insulation breakdown in an unintended area is accelerated.

When the amount of mercury contained by the discharge state is increased even more, the pressure in the discharge space is increased even more as a result of vaporization of the mercury. The restart property under the conditions for the above described restart is therefore degraded even more. It is therefore desirable for the voltage to be made at least twice as high as the voltage Vtmin which is necessary for starting the above described main discharge in the lamp in the room temperature state. Here the circumstance remains that with an increase five times as high as Vtmin the above described danger of an insulation breakdown in an unintended area is accelerated, and that any possibility of improvement of the restart property can hardly be expected, and is the same.

When the data about the distance between the electrodes of 1.2 mm in FIG. 1 is observed, in the region with a voltage of less than 10.25 kV which is 2.5 times as high as the voltage Vtmin of 4.1 kV which is necessary for starting the above described main discharge in the lamp in the room temperature state, or in the area with a voltage of less than 12.3 kV which is three times as high as the above described voltage Vtmin of 4.1 kV, the time (Trst) in which a restart is impossible according to the increase in the peak voltage (Vtrg) of the high voltage pulse is reduced, as discussed before. It is therefore desirable that the peak voltage (Vtrg) of the high voltage pulse be greater than or equal to roughly 2.5 times or greater than or equal to roughly three times as high as Vtmin.

In an area with a voltage of greater than 16.4 kV which is four times as high as Vtmin, or in an area with a voltage of greater than 18.45 kV which is 4.5 times as high as Vtmin, the effect of a reduction of the time (Trst) in which restart is impossible, becomes smaller and smaller with respect to an increase the peak voltage (Vtrg) of the high voltage pulse. Therefore, it is desirable that the peak voltage (Vtrg) of the high voltage pulse be less than or equal to roughly four times or less than or equal to roughly 4.5 times as high as Vtmin.

As was described above, after starting the discharge of the lamp (Ld), no discharge current of the lamp (Ld) flows in the primary winding (Pe) and the secondary winding (Se) of the high voltage transformer (Te) of the starter (Ue) because the outside trigger method is used. In the primary winding (Pe) and in the secondary winding (Se) of the high voltage transformer (Te) of the starter (Ue) there is therefore no heat loss. Therefore both an increase in the size and weight of the starter (Ue) can be avoided.

Therefore, a light source device can be implemented by the arrangement of the light source device of the invention, in which even under the conditions for the above described hot restart the restart property is improved, in which furthermore the danger of insulation breakdown in an unintended area will be suppressed, and in which an increase in the size and weight of the starter is avoided. The invention is described below using FIG. 7. The length of the current conduction path for connection of one part of the circuit on the secondary side of the high voltage transformer (Te) to the above described auxiliary electrode (Et) can be reduced by the measure that a high voltage generation part (Ub) which contains at least one high voltage transformer (Te) of the starter circuit (Ue) is separated from the feed circuit part (By).

In this way, the electrostatic capacity which is formed between the current conduction path part for connection of the circuit part on the secondary side of the high voltage transformer (Te) to the above described auxiliary electrode (Et) and the conductor in the vicinity can be reduced, as can the inductance of the above described current conduction path.

In the case in which the starter produces a pulsed high voltage, the adverse affect that the dulling distortion of the pulsed high voltage, which is caused by the presence of the above described electrostatic capacity of the current conduction path and by the presence of the inductance reduces the voltage increase between the electrodes (E1, E2) of the lamp, is suppressed. Furthermore, the disadvantage that a larger amount of energy than necessary must be emitted is also eliminated. Therefore, a pulse width increase by dulling distortion of the pulsed high voltage and an insulation breakdown formed in an unintended area can be suppressed.

Since the length of the current conduction path for connection of the circuit part on the secondary side of the high voltage transformer (Te) to the above described auxiliary electrode (Et) can be reduced and thus the size of the loop area decreased, the disadvantage of noise emission can be eliminated.

Because the length of the connection line between the above described starter and the above described auxiliary electrode (Et) is small, the possibility of formation of an insulation breakdown in an unintended area can also be suppressed in the case in which the above described starter produces a high voltage for which the voltage increases relatively slowly.

Referring to FIG. 3, the insulation efficiency of the high voltage transformer (Te) of the above described starter which produces a high voltage inevitably degrades with increasing use. On the other hand, the lamp (Ld) has its service life. In this respect, the lamps must be replaced within a limited operating time. By making the above described lamp (Ld) and at least the high voltage transformer (Te) of the above described starter into a one-part unit, when the lamp is replaced as a result of its service life the high voltage transformer (Te) of the above described starter is also replaced. Thus the danger of insulation breakdown as a result of degradation of the insulation efficiency of the high voltage transformer (Te) of the above described starter can be prevented.

Furthermore, it is advantageous when the length of the connecting line between the above described starter and the above described auxiliary electrode (Et) is reduced even more the formation of an insulation breakdown in an unintended area is also suppressed. This embodiment is also advantageous for the situation in which the above described starter produces a pulsed high voltage since the above described disadvantage of noise emission is eliminated.

In this embodiment, the cost of lamp replacement can be further reduced by one-part which contains an optical means for deflecting the emission of the lamp (Ld) in a certain direction, such as a concave mirror or the like.

Figure 4:
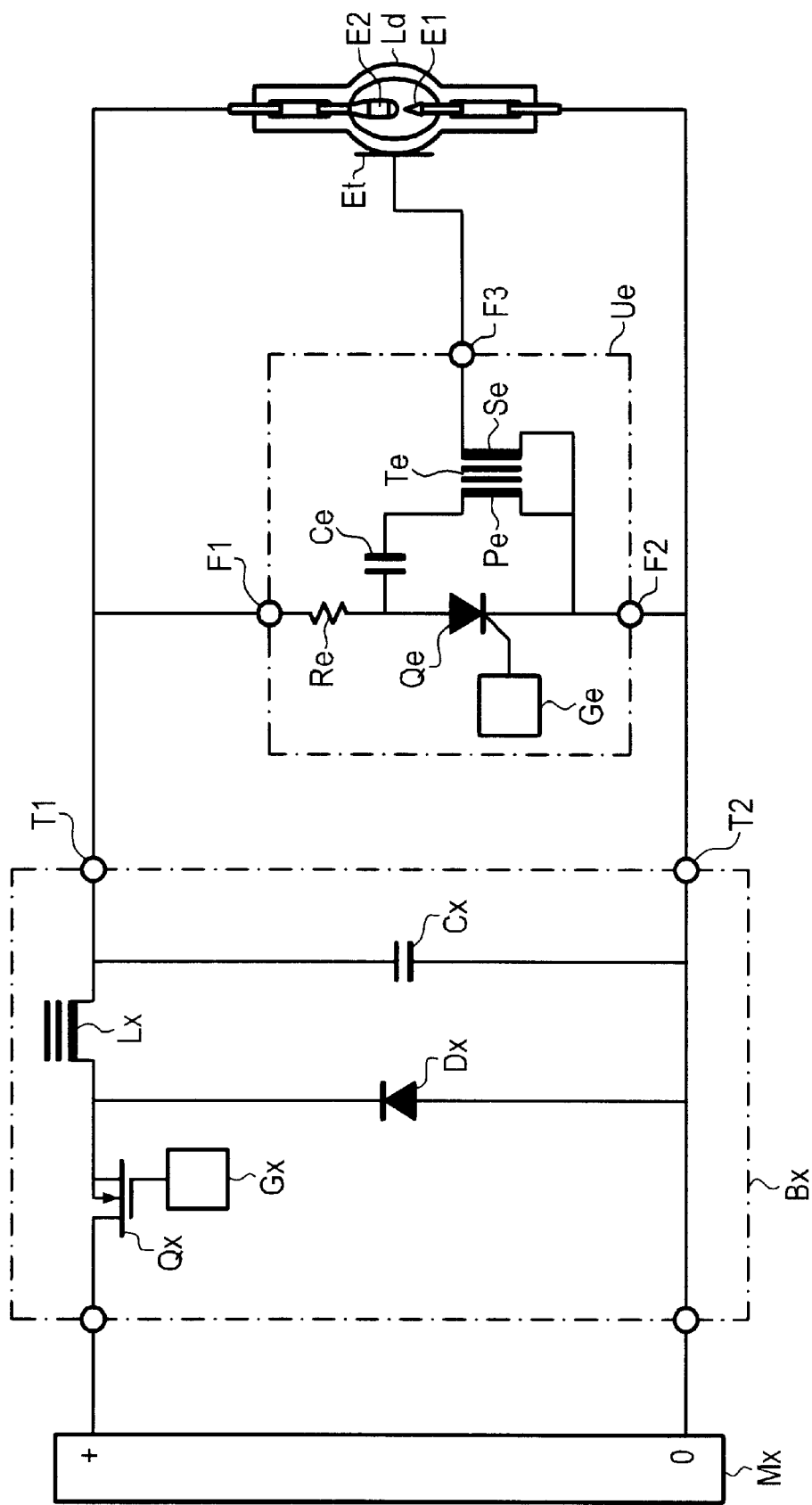
FIG. 4 is a circuit diagram of an embodiment of a discharge lamp light source device of the invention using a high voltage pulse starter and a DC operation system.

FIG. 4 shows another embodiment of the invention in a simplified representation. A power factor corrector (PFC) or the like is connected as a feed circuit (Bx) of the voltage reduction chopper type. In the feed circuit (Bx), using a switching device (Qx) such as a FET or the like, the current from a DC source (Mx) is turned on or off, and a smoothing capacitor (Cx) is charged via a reactance coil (Lx). The switching device (Qx) is supplied with a gate signal with a suitable duty factor from the gate driver circuit (Gx) such that the discharge current flowing between the electrodes (E1, E2) for the main discharge of the lamp (Ld), the voltage between the electrodes (E1, E2) for the main discharge or the lamp output as the product between this current and this voltage has a suitable value which corresponds to the state of the lamp (Ld) at the respective time.

Normally, for suitable control of the above described lamp current, the above described lamp voltage or the above described lamp output, there is a voltage divider resistor or a shunt resistor for determining the voltage of the smoothing capacitor (Cx) and the current supplied from the smoothing capacitor (Cx) to the lamp. Furthermore, normally there is a control circuit which makes it possible for the gate driver circuit (Gx) to produce a suitable gate signal. They are, however, not shown in FIG. 4.

In the case of operation of the lamp (Ld), before starting, the above described no-load voltage is applied between the electrodes (E1, E2) for the main discharge of the lamp (Ld). Since the input point (F1) and the ground point (F2) of the starter (Ue) are connected parallel to the lamp (Ld), the same voltage as the voltage applied to the lamp (Ld) is also supplied to the starter (Ue). When this voltage is received, a capacitor (Ce) is charged via a resistor (Re) at the starter (Ue).

By closing the switching device Qe, such as a SCR thyristor or the like, by a gate driver circuit (Ge) with suitable timing, the charging voltage of the capacitor (Ce) is applied to the primary winding (Pe) of the high voltage transformer (Te). In the secondary winding (Se) of the high voltage transformer (Te), an increased voltage is formed which corresponds to the design of the high voltage transformer (Te). In this case, the voltage which has been applied to the primary winding (Pe) drops quickly according to the discharge of the capacitor (Ce). The voltage formed in the secondary winding (Se) likewise drops quickly. The voltage formed in the secondary winding (Se) therefore becomes a pulse.

One end of the secondary winding (Se) of the high voltage transformer (Te) is connected to one of the electrodes of the lamp (Ld), specifically to the electrode (El) (cathode in this case). The other end of the secondary winding (Se) of the high voltage transformer (Te) is connected to an auxiliary electrode (Et) which is located outside the discharge vessel (11) of the lamp (Ld). The high voltage formed in the secondary winding (Se) of the high voltage transformer (Tc) produces a discharge between the one electrode (E1) of the lamp (Ld) and the inside of the discharge vessel (11) of the lamp (Ld) by a dielectric barrier discharge.

The starter (Ue) is constructed such that when the starter to which the above described no-load voltage has been applied is operated, the peak value of a high voltage formed at the output point (F3) and on the ground point (F2) of the starter (Se) is the value at which a voltage two to five times as high as the voltage Vtmin is necessary for starting the above described main discharge in the lamp (Ld) when in the room temperature state.

Generally, the voltage on the secondary side of a transformer can be roughly estimated by multiplying the voltage on the primary side by the winding ratio of the primary winding to the secondary winding. In this case, as was described above, the voltage on the secondary side is a pulse. The waveform of the voltage formed in the secondary winding (Se) is therefore influenced by the cross inductance of the high voltage transformer (Te) and by a parasitic electrostatic capacity. Therefore, it is advantageous to determine the winding number of the secondary winding (Se) of the high voltage transformer (Te) after running tests with secondary windings with a different winding number.

Whether the starter is constructed correctly can be confirmed by measuring the peak value V1 and the peak value V2 and by the value resulting from division of the value V1 by the value V2 being 2 to 5. The value V1 is the peak value of the voltage which arises at the output point (F3) and the ground point (F2) of the starter (Ue) in the no-load state in which the lamp (Ld) is not connected. The value V2 is the peak value of the voltage which is formed at the output point (F3) and the ground point (F2) of the starter (Ue) when in the state in which the lamp (Ld) is connected and at the room temperature state, the possible output voltages of the starter are made limitable, when this capacity is gradually increased and when the probability of successful lamp starting reaches at least 50%.

Figure 13:
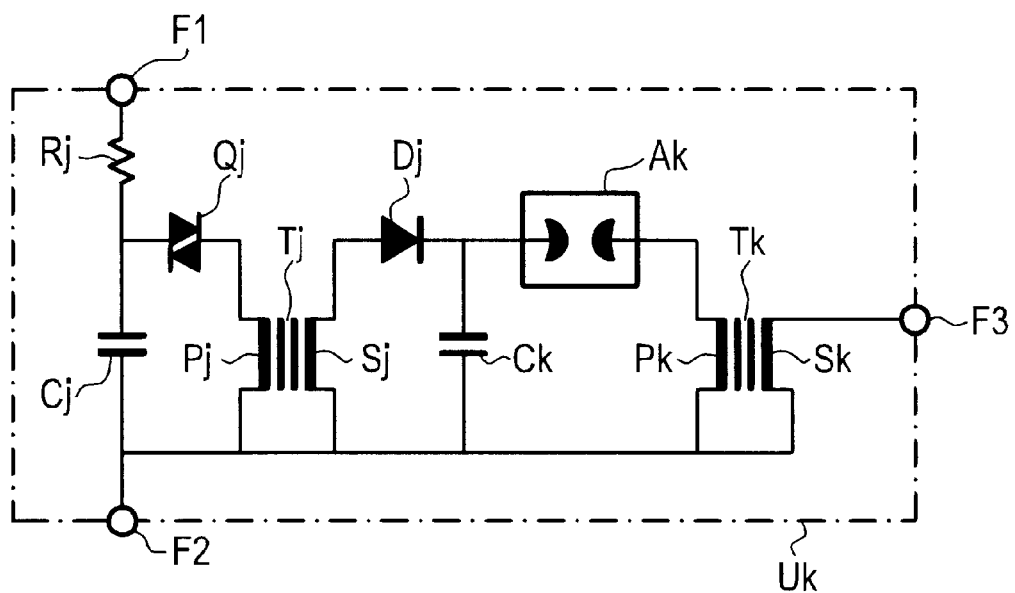
FIG. 13 is a circuit diagram of a starter using a discharge gap such as a surge arrester.
Figure 12:
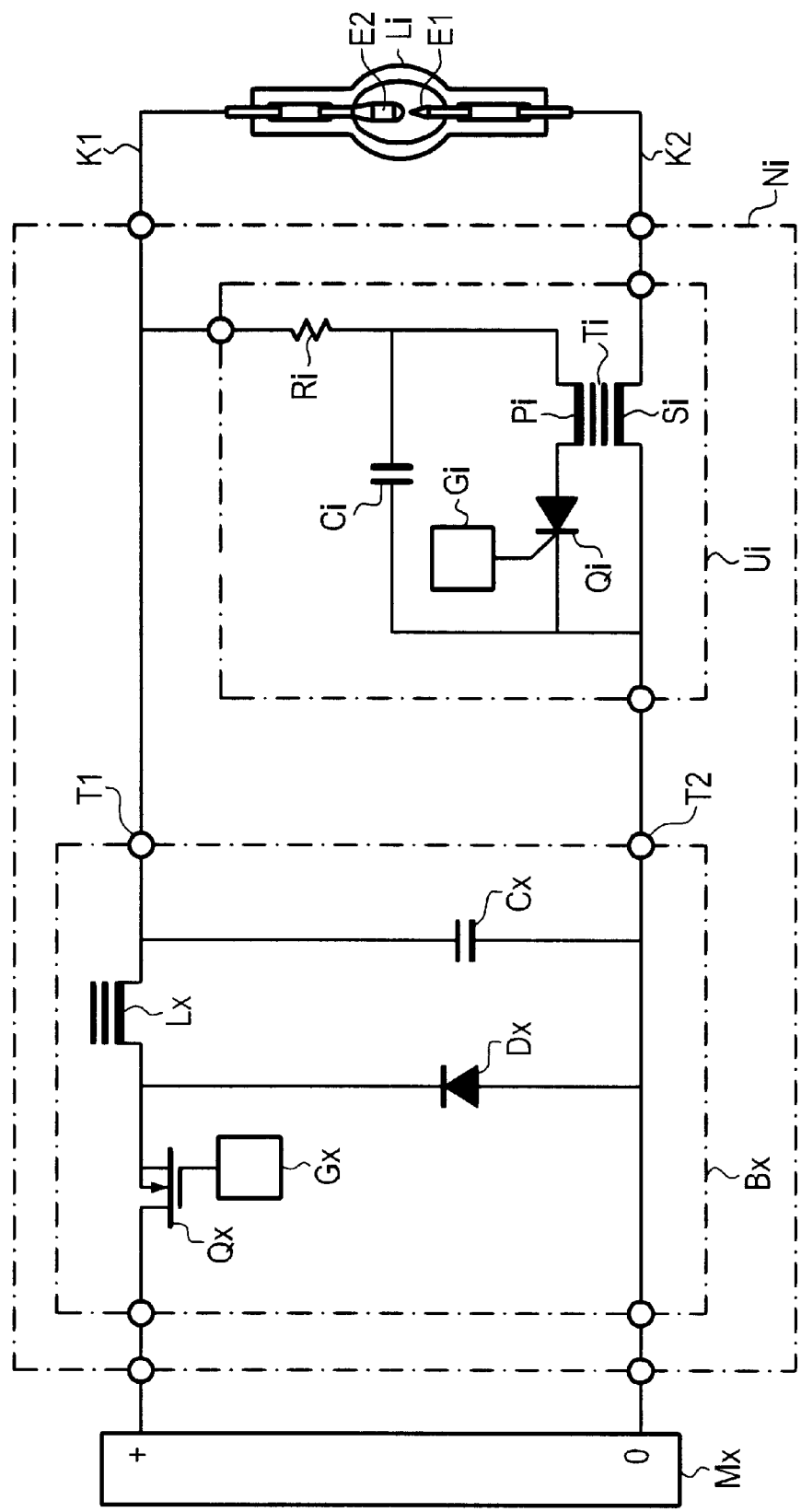
FIG. 12 is a circuit diagram of the arrangement of a conventional discharge lamp light source device.

As a method for enabling limitation of the possible output voltage of the starter the following methods can be used:

- changing the winding ratio of the primary winding to the secondary winding of the high voltage transformer (Te or Tk);
- the voltage supplied to the current source input point (F1) for the starter (Ue) originates from a variable voltage source (Vp) which is shown for example in FIG. 3;
- placing a Zener diode in parallel to the capacitor (Ce) to clip the charging voltage of the latter;
- controlling the timing for closing the switching device (Qe), controlling the voltage of the capacitor (Ce) at the instant of closing the switching device (Qe) and thus controlling the voltage applied to the primary winding (Pe) of the high voltage transformer; or
- in the case of the starter (Uk) which is shown in FIG. 13 and in which a discharge gap (AK), such as a surge arrester or the like, is used, and in which this operating voltage fixes the output voltage of the starter, replacing the above described discharge gap (AK) and the like by one with a different operating voltage.

In the starter (Uk) shown in FIG. 13, charging of the capacitor (Cj) is started via a resistor (Rj). Closing of the switching device (Qj), such as a SIDAC or the like, takes place by itself, when the voltage of the capacitor (Cj) is charged up to a given threshold voltage. This voltage is applied to the primary winding (Pj) of the transformer (Tj). The capacitor (CK) on the secondary side is charged via a diode (Dj) which is connected to the secondary winding (Sj). When the discharging of a capacitor (Cj) on the primary side continues, and when the current reaches a value which is less than or equal to a given value, the switching device (Qj) is shifted by itself into the unclosed state. Thus, charging of the capacitor (Cj) is started again. For each charging and discharging of the capacitor (Cj) the charge of the capacitor (Cj) is accumulated on the secondary side. Its voltage is increased more and more. When the voltage of the capacitor (Ck) is charged up to a given threshold voltage, the discharge gap (AK), such as a surge arrester or the like, is closed by itself. This voltage is applied to the primary winding (Pk) of a transformer (Tk), by which a high voltage is produced on the secondary winding (Sk).

In FIG. 4, the high voltage of the starter is applied between the cathode side of the lamp and auxiliary electrode. But it can also be applied between the anode side of the lamp and the auxiliary electrode.

Figure 5:
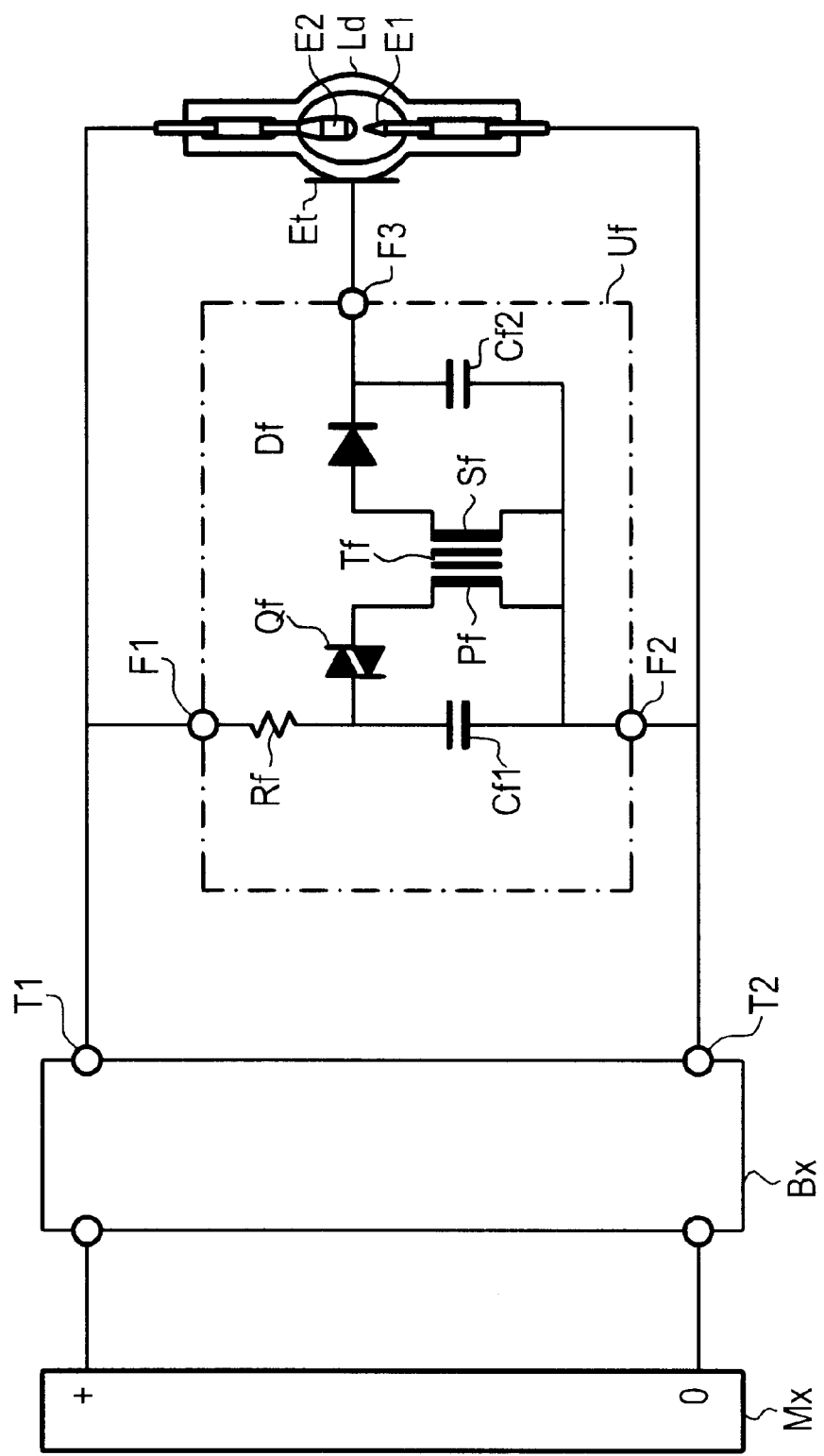
FIG. 5 is a circuit diagram of an embodiment of the invention using a DC starter and a DC operation system.

FIG. 5 shows another embodiment of the invention described in FIG. 1 in a simplified representation. In the embodiment shown using FIG. 4, the embodiment of using a starter (Ue) which produces a pulsed high voltage is shown. FIG. 5 shows the embodiment of using a starter (Uf) which produces a high voltage in which the voltage increases relatively slowly. In the same way, as in FIG. 4, the input point (F1) and the ground point (F2) of the starter (Uf) are connected parallel to a lamp (Ld). The above described no-load voltage which has been applied to the lamp (Ld) is therefore also supplied to the starter (Uf). When this voltage is received, charging of the capacitor (Cf1) is started at the starter (Uf) via a resistor (Rf). Closing of the switching device (Qf), such as a SIDAC or the like, takes place by itself when the voltage of the capacitor (Cf1) is charged up to a given threshold voltage. This voltage is applied to the primary winding (Pf) of the high voltage transformer (Tf). A capacitor (Cf2) on the secondary side is charged via a diode (Df) which is connected to the secondary winding (Sf). When the discharging of a capacitor (Cf1) on the primary side continues, and when the current reaches a value which is less than or equal to a given value, the switching device (Qf) moves by itself into the unclosed state. Thus, charging of the capacitor (Cf1) is started again. For each charging and discharging of the capacitor (Cf1) the charge of the capacitor (Cf2) is accumulated on the secondary side. Its voltage is increased more and more.

One side of the capacitor (Cf2) is connected to one of the electrodes of the lamp (Ld), specifically to the electrode (E1) (cathode in this case). The other side of the capacitor (Cf2) is connected to the auxiliary electrode (Et) which is located outside the discharge vessel (11) of the lamp (Ld). The voltage of the capacitor (Cf2) produces a discharge when the ignition voltage is reached at this point between one electrode (E1) of the lamp (Ld) and the inside of the discharge vessel (11) of the lamp (Ld) by a dielectric barrier discharge.

When this discharge has taken place, the lamp has been started and when the transition to arc discharge has been successfully completed, the voltage of the lamp (Ld) decreases, i.e. as a result, the voltage supplied to the starter (Uf), by which the charging voltage of the capacitor (Cf1) decreases and the switching device (Qf) is shut down.

The starter (Uf) is designed such that when the starter to which the above described no-load voltage has been applied is operated, the maximum value of the high voltage formed at the output point (F3) and at the ground point (F2) of the starter (Uf) is a value at which there is a voltage two to five times as high as the voltage Vtmin which is necessary for starting the above described main discharge in the lamp (Ld) in the room temperature state, as was described above.

Whether the starter is constructed correctly can be confirmed by measuring the voltage V3 and the voltage V4 and by the value resulting from division of the value V3 by the value V4 being 2 to 5. The voltage V3 is formed in the idle state in which the lamp (Ld) is not connected, at the output point (F3) and the ground point (F2) of the starter (Uf). The voltage V4 is formed at the output point (F3) and the ground point (F2) of the starter (Uf) when in the state in which the lamp (Ld) is connected in the room temperature state, when the output voltage of the starter is gradually increased, and when the probability of successful lamp starting reaches essentially 50%.

In FIG. 5, the high voltage of the starter is applied between the cathode side of the lamp and the auxiliary electrode. But it can also be applied between the anode side of the lamp and the auxiliary electrode.

Figure 6:
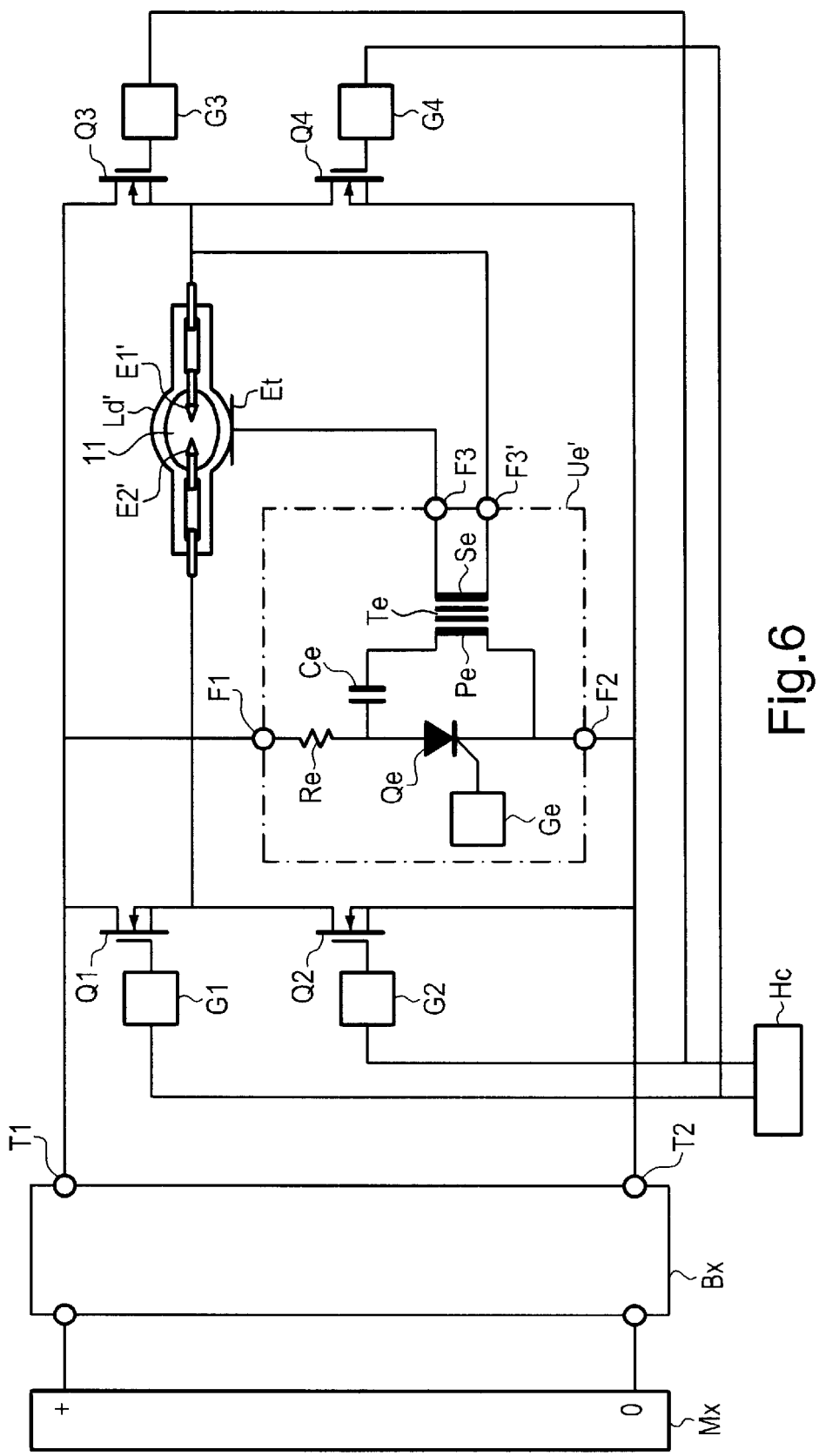
FIG. 6 is a circuit diagram of an embodiment of a discharge lamp light source device of the invention using a high voltage pulse starter and an AC operation system.

FIG. 6 shows another embodiment of the invention in a simplified representation. In the circuit shown in FIG. 6, compared to the one described above, in the circuit shown in FIG. 4, switching devices (Q1, Q2, Q3, Q4) such as FET or the like are additionally used and thus a full bridge inverter is formed so that it has become possible for an AC discharge voltage to be applied to the lamp (Ld').

The switching devices (Q1, Q2, Q3, Q4) are each driven by gate driver circuits (G1, G2, G3, G4) which are controlled by a full bridge inverter circuit (He) such that the switches (Q1, Q4) and the switches (Q2, Q3) which each are diagonal elements of the full bridge inverter are closed at the same time.

In FIG. 4, in the starter (Ue) one end of the secondary winding (Se) is connected to the ground point (F2). In the starter (Ue') in FIG. 6 it is directly connected as the output point (F3') to the feed line of one of the electrodes of the lamp (Ld'), specifically of the electrode (E1'), although the starter (Ue') is identical to the starter (Ue) shown in FIG. 4.

The high voltage formed at the output points (F3, F3') of the starter (Ue') is applied between the electrode (E1') for the main discharge of the lamp (Ld') and the auxiliary electrode (Et). Between the electrode (E1') and the inside of the discharge vessel (11) of the lamp (Ld') a discharge is formed by the dielectric barrier discharge, by which the lamp is started.

If it is possible for the timing of the changeover of the closed states of the switching devices (Q1, Q2, Q3, Q4) of the full bridge inverter and the formation of the high voltage of the starter (Ue') to be unfavorable with respect to starting of the lamp discharge, this disadvantage with respect to the timing behavior can be avoided with regard to the starting of the lamp discharge either by synchronization such that the timing of changeover of the closed states of the switching devices (Q1, Q2, Q3, Q4) and of the formation of the high voltage of the starter (Ue') becomes correct, or by stopping the operation of the full bridge inverter up to completion of the starting of lamp discharge. The starter (Ue') in the circuit in FIG. 6 can also be replaced by the starter (Uf) which is shown in FIG. 5 and which generates a high voltage in which the voltage increases rather slowly, although this is not shown in FIG. 6. In that case, one end of the secondary winding (Sf) and the capacitor (Cf2) are directly connected to the line installation of the electrode (E1') of the lamp (Ld'). They are connected to the ground point (F2) at the starter (Uf) in FIG. 4.

Figure 7:
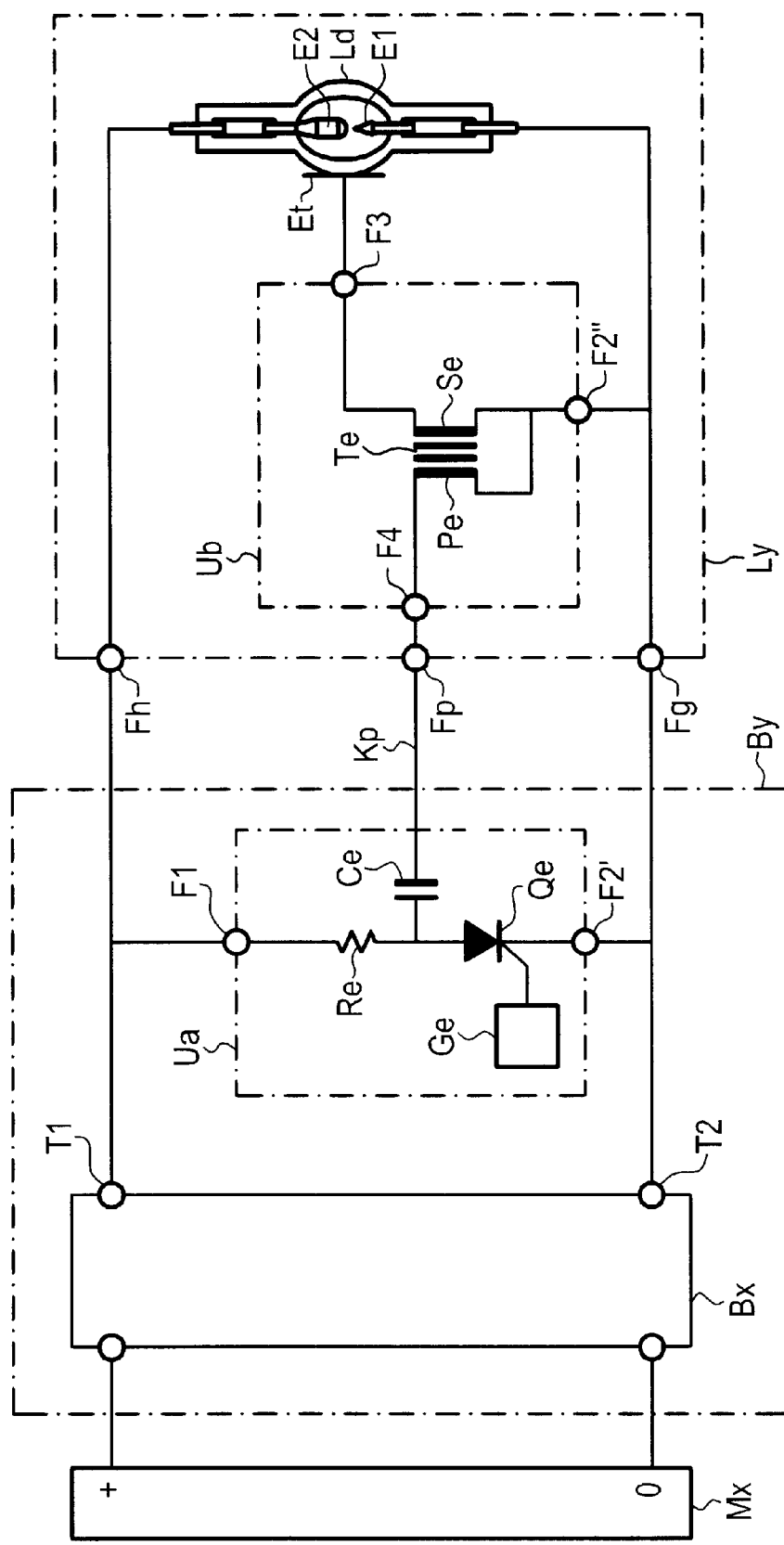
FIG. 7 is a circuit diagram of an embodiment of a discharge lamp light source device of the invention.

FIG. 7 shows another embodiment of the invention in a simplified representation. In FIG. 7, the starter consists of a starter transformer driver circuit part (Ua) and a high voltage transformer circuit part (Ub) which contains at least one high voltage transformer (Te). These circuit parts (Ua, Ub) are formed by dividing the starter (Ue) described in FIG. 4. The starter transformer driver circuit part (Ua) is part of the starter (Ue) without the high voltage transformer circuit part (Ub).

The above described high voltage transformer circuit part (Ub) is located separately from the feed circuit part (By). The ground point (F2) of the starter (Ue) is divided into a ground point (F2') of the starter transformer driver circuit part (Ua) and into a ground point (F2") of the high voltage transformer circuit part (Ub). Furthermore, there is in addition a connection line (Kp) to the primary winding (Pe) of the high voltage transformer (Te).

The connection line (Kp) has an extremely low voltage, while the line described in FIG. 4 transmits a high voltage pulse from the output point (F3) of the starter (Ue) to the auxiliary electrode (Et) of the lamp (Ld). The fear of an adverse effect by the additional connection line (Kp) is low, i.e. the fear is low that the possibility of emission of noise and formation of an insulation breakdown in an unintended area will increase.

Figure 11:
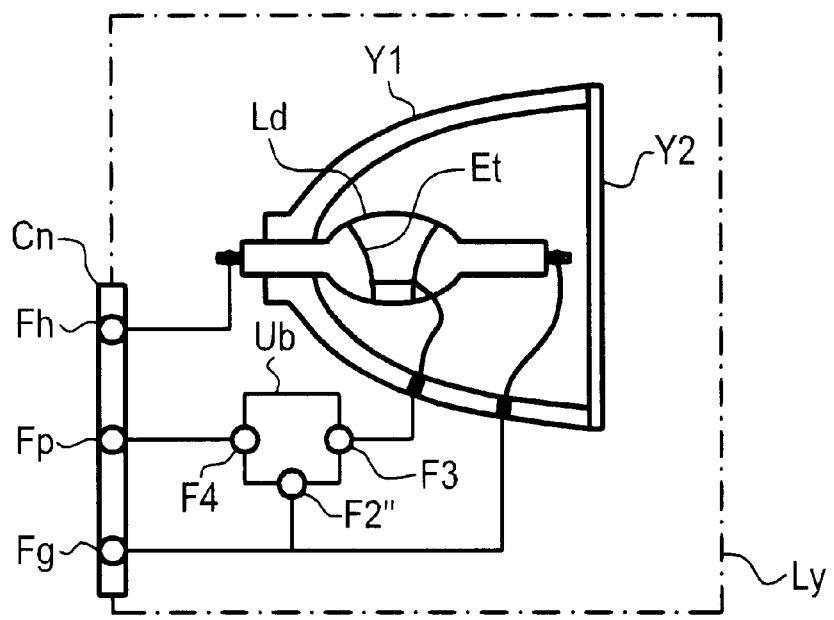
FIG. 11 is a schematic representation of an embodiment of the lamp housing of the discharge lamp light source device of the invention.

FIG. 11 shows still another embodiment of the invention in a simplified representation. In FIG. 11, the lamp (Ld) and the high voltage transformer circuit part (Ub) of the above described starter are formed in one part as the lamp housing (Ly). Here, an embodiment is shown in which for the lamp housing (Ly) a reflector (Y1), a light outlet window (Y2) and a connector (Cn) are formed in one piece. The reflector (Y1) is used for the emission of the lamp to emerge pointed in a certain direction. The light outlet window (Y2) jackets the front of the reflector (Y1). The connector (Cn) electrically connects the feed circuit part (By) to the lamp housing (Ly).

Figure 8B:
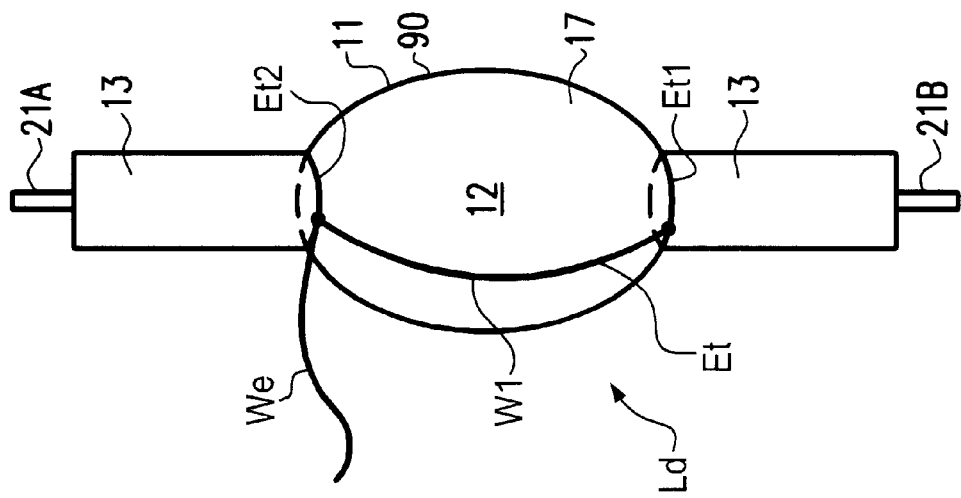
FIG. 8(*a*) is a schematic representation of an embodiment of the arrangement of the auxiliary electrode of a lamp of a discharge lamp light source device of the invention.
Figure 8A:
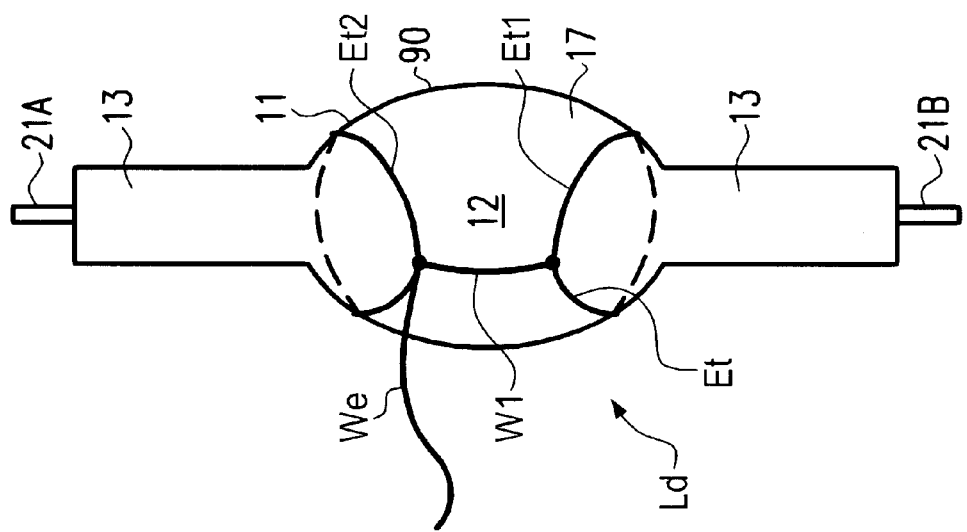

FIGS. 8(a) & 8(b) show embodiments of the lamp part of the invention in simplified representations. In an arrangement of the auxiliary electrode (Et) in a discharge lamp such that it does not come into contact with the discharge space (12) for the main discharge, the following arrangement methods can be undertaken:

The auxiliary electrode (Et) is embedded in the area (17) which surrounds the discharge space.

The auxiliary electrode (Et) makes contact with the outside of the area (17) which surrounds the discharge space.

The auxiliary electrode (Et) is located in the vicinity of the outside of the area (17) which surrounds the discharge space.

FIGS. 8 (a) & 8(b) each show one example of an arrangement in which the auxiliary electrode (Et) makes contact with the outside of the area (17) of the discharge lamp which surrounds the discharge space. Here, in a discharge lamp (Ld) in the discharge space (12) formed by a discharge vessel (11) there is a pair of electrodes (E1, E2) opposite one another for the main discharge and moreover there is an auxiliary electrode (Et), besides the above described electrodes for the main discharge, arranged such that it does not come into contact with the discharge space (12) for the main discharge. Here the feature consists in that the above described auxiliary electrode (Et) is formed by a connection between a first conductive ring (Et1) to a second conductive ring (Et2) by means of a conductive wire (W1). The first conductive ring (Et1) has a smaller peripheral length than the peripheral length of the area (90) on which the area (17) which surrounds the discharge space (12) of the above described discharge lamp (Ld) has its greatest thickness. The first conductive ring (Et1) is located on the side which is nearer the above described electrodes (E1, E2) for the main discharge than the area (90) with the greatest thickness of the above described area (17) which surrounds the discharge space. The second conductive ring (Et2) has a smaller peripheral length than the peripheral length of the area (90) with the greatest thickness of the area (17) which surrounds the discharge space (12). The first conductive ring (Et2) is located on the side which is nearer the other electrode of the above described electrodes (E1, E2) for the main discharge than the area (90) with the greatest thickness of the above described area (17) which surrounds the discharge space.

The above described method by which the auxiliary electrode is embedded in the above described area (17) which surrounds the discharge space has the following disadvantages:

The lamp discharge vessel must be produced by processing using a torch; this entails labor cost.

By embedding the auxiliary electrode material, i.e., a different material, such as a metal or the like, into the material of the discharge vessel such as quartz glass or the like, the danger of the formation of cracks in the discharge vessel arises as a result of different coefficients of thermal expansion.

The above described method by which the auxiliary electrode is located in the vicinity of the outside of the above described area (17) which surrounds the discharge space has the following disadvantages:

In order to determine the location of the lamp discharge vessel to the auxiliary electrode, a fixed holding arrangement for the auxiliary electrode is necessary. Since the surface temperature of the lamp in the operating state reaches roughly 1000° C., and since the above described holding arrangement requires special thermal resistance and a special mechanical accuracy, costs are high.

Lamp emission is shielded by installation of one such fixed lamp arrangement for the auxiliary electrode in the vicinity of the lamp. This reduces the power-space ratio of the lamp emission.

On the other hand, in the above described method by which contact is made between the auxiliary electrode and the outside of the area (17) which surrounds the discharge space, and in which for example the periphery of the area (17) which surrounds the discharge space is wound with a thin, conductive wire, the above described disadvantages of the labor cost and the danger of cracking in the discharge vessel in the method of arrangement by embedding the auxiliary electrode in the area (17) which surrounds the discharge space do not arise. The above described disadvantages of high costs and the reduction in the power/space ratio of lamp emission do not arise in the method of arrangement in which the auxiliary electrode is located in the vicinity of the outside of the area (17) which surrounds the discharge space.

However, in the case of a lamp with a shape of the area (17) which surrounds the discharge space in which the middle area is arched, the method for arranging the auxiliary electrode (Et) by winding with a thin conductive wire encounters a serious disadvantage when an attempt is made to place it in the vicinity of the middle region of the area (17) which surrounds the discharge space, this vicinity of the middle region of the area (17) for starting the main discharge of the lamp by a dielectric barrier discharge being an effective position for the placing the auxiliary electrode (Et).

Since the middle region of the area (17) which surrounds the discharge space is arched, the disadvantage arises that the wound wire moves by sliding in the direction to one of the electrodes (E1 or E2) for the above described main discharge even if the vicinity of the middle region of the area (17) is wound with a thin conductive wire which represents the auxiliary electrode (Et).

The result of this motion is that the wound wire moves toward the area (17) which surrounds the discharge space and toward the hermetically sealed portion (13), the area (17) and the portion (13) having a smaller cross sectional area than the cross sectional area surrounded by the wound wire. In this way, the gap between the auxiliary electrode (Et) and the area (17) which surrounds the discharge space increases in size. The effect for starting the main discharge of the lamp by a dielectric barrier discharge is therefore diminished.

Furthermore, in the case in which the auxiliary electrode (Et) moves beyond the hermetically sealed portion (13) and reaches the outer lead pins (21A, 21B), in this respect a short circuit of the voltage applied to the auxiliary electrode (Et) is caused, resulting in the danger that the lamp cannot be started, as well as the danger of damage to the feed circuit (Bx).

Conversely, in the case in which the auxiliary electrode (Et) is arranged in the manner shown above using FIGS. 8(a) & 8(b), the two conductive rings (Et1, Et2) are arranged such that between the two the areas (90) with the thickest appearance of the above described area (17) which surrounds the discharge space is clamped. They are connected to one another by means of the conductive wire (W1). Therefore, there is the advantage that it is possible to prevent the disadvantage that the auxiliary electrode (Et) which consists of these wires (Et1, Et2, W1) will move away from the point which is advantageous for a dielectric barrier discharge for starting the main discharge of the lamp.

The auxiliary electrode (Et) comprising the conductive wires (Et1, Et2, W2) is furthermore connected via a connected conductive wire (We) to the output point (F3) of the starter (Ue). For these conductive wires, a material with high thermal conductivity such as tungsten or the like should be used, since the discharge vessel (1) reaches a high temperature during lamp operation.

FIGS. 9(a) & 9(b) show another embodiment of the lamp part of the invention in simplified representations. In FIGS. 9(a) & 9(b), the outer lead pin (21A) on the cathode side of the lamp (Ld) is connected to the ground point (F2) of the starter (Ue) and the ground output point (T2) of the feed circuit (Bx) and the outer lead pin (21B) on the anode side is connected to the positive output point (T1) of the feed circuit (Bx).

On the other hand, the auxiliary electrode (Et) is connected via the wire (We) to the output point (F3) of the starter (Ue) and furthermore to the conductor (Et3) via a conductive wire (W2), the conductor (Et3) being arranged such that it surrounds the cathode side of the hermetically sealed portion (13). In FIGS. 9(a) and 9(b), the conductor (Et3) which is arranged such that it surrounds the cathode side of the hermetically sealed portion (13) is provided with a conductive coil with which the cathode side of the above described hermetically sealed portion (13) is wound.

Since the output point (F3) and the ground point (F2) of the starter (Ue) are connected to the two ends of the secondary winding (Se) of the high voltage transformer (Te), in the time in which the starter (Ue) is not operated, especially during operation after completion of lamp starting, no voltage arises between the output point (F3) and the grounding point (F2) of the starter (Ue).

As was described above, the outer lead pin (21A) is connected on the cathode side to the ground point (F2) of the starter (Use). The conductor (Et3) which is arranged such that it surrounds the cathode side of the hermetically sealed portion (13) is connected via the conductive wire (W2), the auxiliary electrode (Et) and the conductive wire (We). Therefore, during operation, the connection point (Fz) of the ground point (F2) of the starter (Ue) via the line from the outer lead pin (21A) on the cathode side as far as the ground output point (T2) of the feed circuit (Bx), and the conductor (Et3) is arranged such that it surrounds the cathode side of the hermetically sealed portion (13) and are kept in the state of the same electrical potential.

Since in the operating state of the lamp (Ld) the main discharge current of the lamp (Ld) flows in the conduction path from the tip of the cathode (14) via the outer lead pin (21A) on the cathode side as far as the connection point (Fz), a reduction in the voltage takes place which is proportional to the product between the resistance value of this conduction path and the value of the flowing current, and the electrical potential increases more, the nearer the tip of the cathode (14).

As was described above, the connection point (Fz) and the conductor (Et3) have the same electrical potential. The cathode, especially its part in the vicinity of the hermetically sealed portion (13) therefore has a higher electrical potential than the conductor (Et3) which surrounds its vicinity.

As described in Japanese patent specification HEI 4-40828, in the discharge vessel (11) of a lamp which has reached a high temperature in the operating state, in the area in the vicinity of its hermetically sealed portion (13) metallic cations of impurities which are contained in the material of the discharge vessel (11) are driven in the direction in which they move away from the electrode material which forms the cathode. Thus, the detachment phenomenon which results from an accumulation of metallic ions of impurities on the surface of the above described electrode material, the glass material, such as quartz or the like, of the hermetically sealed portion of the discharge vessel and the above described electrode material is prevented. The arrangement of the lamp described above using FIGS. 9(a) and 9(b) can result in the disadvantage of lamp damage as a result of the above described detachment phenomenon being avoided.

In the case in which the output point (F3) of the starter (Uf) and the ground point (F2) as shown in FIG. 5 are not connected directly to the two ends of the secondary winding (Sf) of the high voltage transformer (Tf), but that elements such as the diode (Df), a resistor and the like are inserted in series, no current or only an extremely small amount of current flows between the output point (F3) and the ground point (F2). Even in the embodiment in which the above described diode (Df) is inserted, a reduction in its voltage (voltage in the case in which the current flows in the forward direction or reverse direction) hardly occurs. Furthermore, even in the embodiment in which the above described resistor is inserted, there is hardly any reduction of this voltage. The above described action that the cathode, especially the part in the vicinity of its hermetically sealed portion (13), reaches a higher electrical potential than the conductor (Et3) which surrounds the vicinity of it, effectively applies.

Figure 10B:
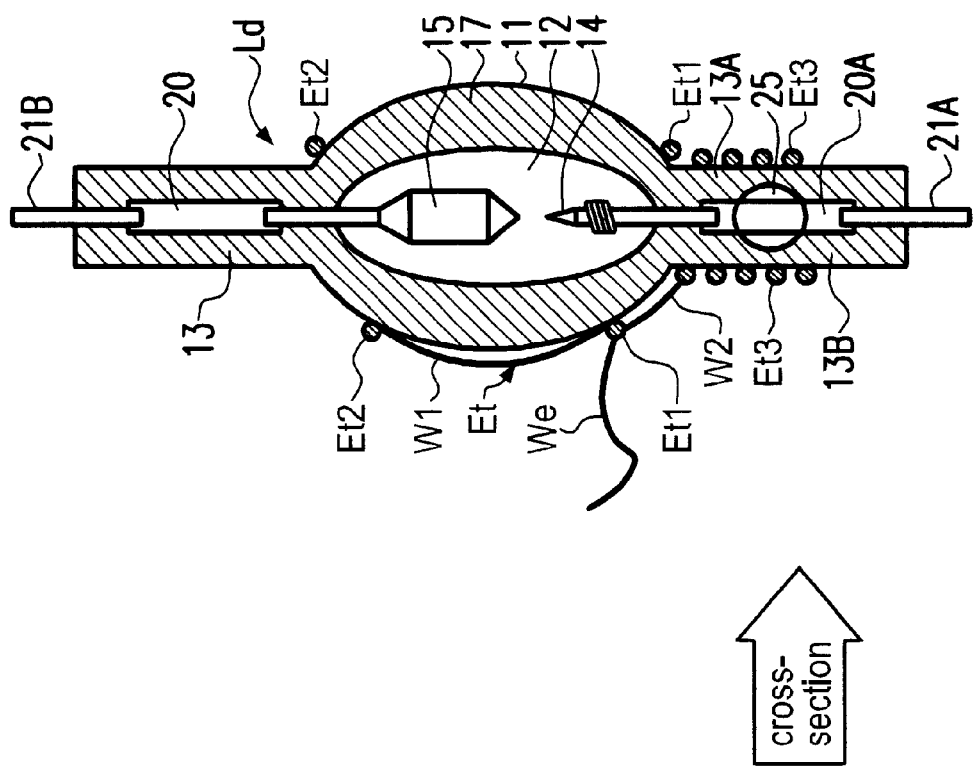
FIG. 10(*a*) is a schematic representation of an embodiment of a lamp with the hermetic space of the discharge lamp light source device of the invention.
Figure 10A:
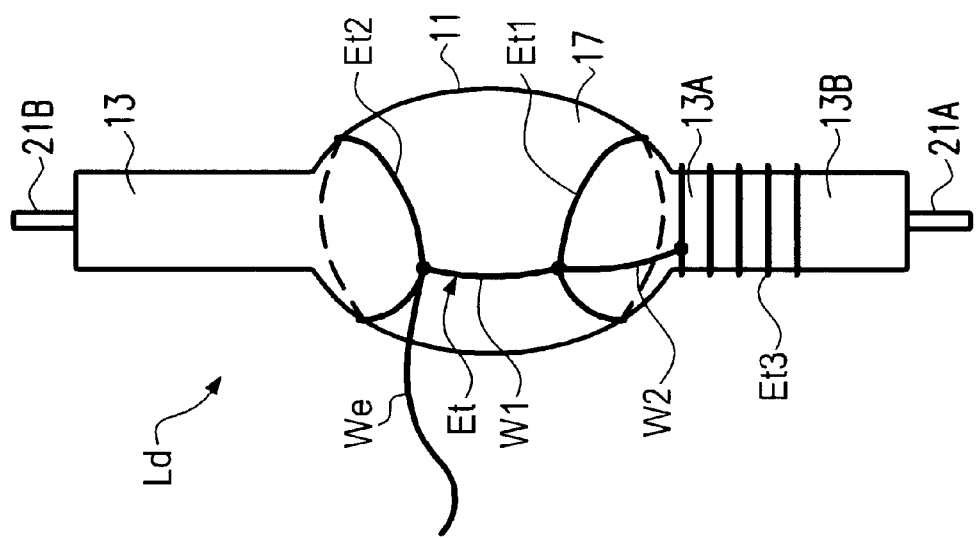

FIGS. 10(a) & 10(b) show another embodiment of the lamp part of the invention in simplified representations. In the lamp shown in FIGS. 10(a) & 10(b), in the discharge space (12) which is formed by a discharge vessel (11), there is a pair of electrodes (14, 15) for the main discharge opposite one another and moreover hermetically sealed portions are formed in which there are conductive metal bodies (20, 20A) for current routing to the above described pair of electrodes for the main discharge. At least in one of these hermetically sealed portions there is a conductive metal body with a great length (20A). At two points remote from one another in the lengthwise direction, hermetically closed sealing areas (13A, 13B) are formed, between which a hermetically sealed space (25) is formed. In this discharge lamp (Ld), besides the above described electrodes for the main discharge, there is furthermore an auxiliary electrode (Et) arranged such that it does not come into contact with the discharge space (12) for the main discharge. The feature furthermore illustrates that opposite at least one part of the above described hermetic space (25) and outside the hermetically closed seal areas/seal area (13A and/or 13B) there is a lead (Et3) and that the above described lead (Et3) is electrically connected to the above described auxiliary electrode (Et).

In FIGS. 10(a) and 10(b), the lead (Et3) which is located opposite at least one part of the above described hermetic space (25) is implemented by a coil with which the above described hermetically closed seal area(s) (13A and/or 13B) is/are wound. The above described hermetic space (25) is made such that it is in contact with the conductive metal foil (20A) of molybdenum or the like which is used to connect the cathode (14) to the outside lead pin (21A).

As is described in Japanese patent disclosure document 2000-348680, the arrangement of the above described hermetic space (25) can result in the advantage that the high voltage discharge lamp will not break. This is because, when in the interior of the hermetically closed seal areas formed on the two points of the hermetically sealed portion, foil floating occurs and its sealing action is lost, the mercury vapor flows within the discharge space (12) into the hermetic space (25) and condenses. The pressure in this high voltage discharge lamp therefore drops considerably. As a result, the discharge state of the high voltage discharge lamp is not maintained.

The above described additional advantage can be obtained in the embodiment of the invention shown in FIGS. 10(a) & 10(b) when the starter is connected between the outer lead pin of the electrodes of the two poles for the above described main discharge which is located on the side on which the above described hermetic space (25) is formed, i.e., the outer lead pin (21A), and the above described auxiliary electrode (Et).

Since the above described hermetic space (25) and the above described discharge space (12) are conductors, in which the conductors are connected to one another jointly within the spaces, (i.e. the conductive metal foil (20A) and the cathode (14) which are connected to one another), and since they are furthermore conductors in which the conductors are connected to one another jointly outside the glass bulb (i.e. the auxiliary electrode (Et) and the conductive coil (Et3) which are connected to one another), the two dielectric barrier dischargers are connected parallel to one another when viewed from the starter.

The temperature of the above described hermetic space (25) is kept lower in lamp operation than the temperature of the above described discharge space (12). In this way it is possible to reduce the amount of mercury added per unit of volume or in practice to set it to zero. The pressure in the above described hermetic space (25) is therefore lower than in the above described discharge space (12). When the starter produces a high voltage, in the above described hermetic space (25), a dielectric barrier discharge is formed much more frequently. When this discharge forms, UV radiation is generated. The generated UV radiation is transmitted by the hermetically closed seal area (13A) and is incident in the above described discharge space (12), by which the gas within the discharge space (12) is ionized; this also leads to more frequent occurrence of a dielectric barrier discharge in the discharge space (12). The hermetic space (25) functions as the light source for optical excitation for the discharge space (12). In the embodiment of the invention shown in FIGS. 10(a) and 10(b), the major advantage can be obtained that the value of the high voltage which the starter is to produce can be decreased.

In the embodiment shown in FIGS. 10(a) & 10(b), the hermetic space (25) is formed such that it is in contact with the conductive metal foil (20A). But it can also be formed such that it is in contact with the extended area of the electrode (14) or with the extended area of the outer lead pin (21A). The thickness of the conductive metal foil (20A) is however normally less than or equal to roughly a few dozen microns. The foil (20A) is therefore thin. Furthermore, in the edge area there are projections like burrs or the like which inevitably form in the production process, or which are intentionally formed. This results in the effect that the electrical field is concentrated on the edge area. Therefore, with respect to the above described enabling of more frequent formation of a dielectric barrier discharge, it is advantageous that the hermetic space (25) is formed such that it is in contact with the conductive metal foil (20A), especially with its edge area.

In the embodiment shown in FIGS. 10(a) & 10(b), the hermetic space (25) is formed in the hermetically closed seal area on the cathode side. The reason for this is that this measure is advantageous with respect to preventing the detachment phenomenon of the glass material, such as quartz or the like, of the hermetically sealed portion of the discharge vessel from the above described electrode material as a result of the metallic cations of the impurities, as was described above using the embodiment shown in FIGS. 9(a) and 9(b). In the embodiment in which this detachment phenomenon can be ignored or in the embodiment in which this can be prevented using other means, the hermetic space (25) can be formed in the hermetically closed seal area on the anode side.

The above described function of the hermetic space (25) as the light source for optical excitation for the discharge space (12) is advantageously developed regardless of whether the voltage applied for the main discharge is a DC voltage or an AC voltage and also regardless of whether the starter produces a high voltage pulse or a high voltage in which the voltage increases rather slowly.

By the invention described above, the restart property is improved even under the conditions of a hot restart, and, furthermore, the danger of insulation breakdown in an unintended area is suppressed. Moreover, a light source device can be implemented in which an increase in the size and weight of the starter is prevented.

In addition, by the invention described above, in the embodiment of a starter which produces a high voltage pulse, it is possible to eliminate the adverse effect of dulling distortion of the pulsed high voltage of the starter, such that the voltage increase between the lamp electrodes is reduced, and the disadvantage of noise emission eliminated. Furthermore, the possibility that in an unintended area an insulation breakdown will form can be largely suppressed.

In addition to the embodiment of the invention described above, the danger of insulation breakdown as a result of degradation of the insulation efficiency of the high voltage transformer of the starter can be prevented a priori. In the case of a starter which produces a high voltage pulse, it is possible to eliminate the adverse effect of dulling distortion of the pulsed high voltage of the starter, that the voltage increase between the lamp electrodes is reduced and that the disadvantage of noise emission is eliminated. Furthermore, the possibility that in an unintended area an insulation breakdown is formed can be largely suppressed.

What is claimed is:

1. Light source device comprising:
    a discharge lamp including a discharge space containing at least 0.15 mg mercury per cubic millimeter of the volume of the discharge space, a pair of main discharge electrodes positioned opposite one another to generate a main discharge, wherein the electrodes are spaced from each other a distance less than or equal to 2.5 mm, and an auxiliary electrode positioned such that the auxiliary electrode does not come into contact with the discharge space for the main discharge;
    a feed circuit for providing a discharge current to the main discharge electrodes for the main discharge; and
    a starter which produces a high voltage between one of the main discharge electrodes and the auxiliary discharge electrode; wherein the starter is adapted to produce a voltage two to five times the voltage necessary to create a main discharge in the lamp when at room temperature.

2. The light source device according to claim 1, wherein the starter for generating the high voltage comprises at least one high voltage transformer in a starter circuit which is separate from the feed circuit.

3. The light source device according to claim 1, wherein the discharge lamp and the at least one high voltage transformer of the starter are constructed as a single unit.

4. The light source device according to claim 1, wherein the auxiliary electrode is positioned on an outer surface of the discharge lamp.

5. The light source device according to claim 1, wherein the auxiliary electrode is coiled around one end of the discharge lamp on the outer surface thereof.

6. The light source device according to claim 1, wherein the auxiliary electrode is positioned on an outer surface of a central portion of the discharge lamp and coiled around an outer surface of one end of the discharge lamp.

* * * * *